US007778626B2

(12) United States Patent
Funnell et al.

(10) Patent No.: US 7,778,626 B2
(45) Date of Patent: Aug. 17, 2010

(54) APPARATUS AND METHOD OF HANDLING SIMULTANEOUS UNIVERSAL TERRESTRIAL RADIO ACCESS NETWORK RADIO RESOURCE CONTROL PROCEDURES WHICH CHANGE THE SECURITY CONFIGURATION IN A UNIVERSAL MOBILE TELECOMMUNICATIONS SYSTEM USER EQUIPMENT

(75) Inventors: Nicola M. Funnell, Warwickshire (GB); David W. Pedlar, Solihull (GB); Robert J. Harrison, Birmingham (GB)

(73) Assignee: M-Stack Limited, Birmingham (GB)

( * ) Notice: Subject to any disclaimer, the term of this patent is extended or adjusted under 35 U.S.C. 154(b) by 655 days.

(21) Appl. No.: 11/688,364

(22) Filed: Mar. 20, 2007

(65) Prior Publication Data

US 2007/0173228 A1      Jul. 26, 2007

Related U.S. Application Data

(63) Continuation of application No. 10/430,867, filed on May 7, 2003, now Pat. No. 7,212,805.

(51) Int. Cl.
H04M 1/66 (2006.01)
(52) U.S. Cl. .................. 455/411; 455/419; 380/249
(58) Field of Classification Search .......... 455/410–411
See application file for complete search history.

(56) References Cited

U.S. PATENT DOCUMENTS 7,212,805 B2* 5/2007 Funnell et al. ............... 455/410
7,257,399 B2* 8/2007 Pedlar ........................ 455/425
2003/0100291 A1* 5/2003 Krishnarajah et al. ....... 455/410
2005/0164675 A1* 7/2005 Tuulos et al. ................ 455/410

OTHER PUBLICATIONS

Universal Mobile Telecommunications System (UMTS); Radio Resource Control (RRC) protocol specification (3GOO TS 25.331 version 3.10.0 Release 1999), ETSI TS 125 331 V3.10.0 (Mar. 2002), pp. 87-98. pp. 217-222. *.*

* cited by examiner

*Primary Examiner*—Nick Corsaro
*Assistant Examiner*—Sarwat Chughtai

(57) ABSTRACT

The details of an apparatus and method of handling simultaneous universal terrestrial radio access network radio resource control procedures which change the security configuration in a universal mobile telecommunications system user equipment are disclosed herein. According to one aspect of the present application, there is provided a user equipment apparatus having a message handler, a sequential processor, a command store, and a security configuration change detector, wherein said message handler is coupled to said command store, is coupled to said sequential processor, and is coupled to said security configuration change detector to save, process, and detect configuration changes in commands respectively, and to determine if there is an existing command at the user equipment, such that the user equipment appears to the UTRAN as though it were processing commands simultaneously. According to another aspect, there is provided a method of processing simultaneous commands at a user equipment having a security configuration, including the steps of: determining if there is an existing command at the user equipment; upon reception of a received command: suspending the existing command processing; determining if commands contain a security configuration change; and either rejecting the received command; or saving the received command prior to resuming the existing command; such that the user equipment appears to the UTRAN to be processing commands simultaneously.

8 Claims, 6 Drawing Sheets

APPARATUS AND METHOD OF HANDLING SIMULTANEOUS UNIVERSAL TERRESTRIAL RADIO ACCESS NETWORK RADIO RESOURCE CONTROL PROCEDURES WHICH CHANGE THE SECURITY CONFIGURATION IN A UNIVERSAL MOBILE TELECOMMUNICATIONS SYSTEM USER EQUIPMENT

CROSS REFERENCE TO RELATED APPLICATION

The present invention is a continuation of application Ser. No. 10/430,867 filed on May 7, 2003.

BACKGROUND

1. Technical Field

This application relates to UMTS (Universal Mobile Telecommunications System) in general, and to an apparatus and method of handling simultaneous universal terrestrial radio access network radio resource control procedures which change the security configuration in a universal mobile telecommunications system user equipment in particular.

2. Description of the Related Art

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, whereas and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Standard document ETSI TS 125 331 v3.10.0 (2002-03) addresses the subject of UMTS RRC (Radio Resource Control) protocol requirements between UTRAN (Universal Terrestrial Radio Access Network) and UE (User Equipment). Although ETSI TS 125 331 specifies the requirement that the UE shall be able to process several RRC procedures, the document may not address how to meet the requirements for handling simultaneous RRC procedures in particular.

Consider a wireless mobile device (UE) that complies with the ETSI specifications for the UMTS protocol. The ETSI specification for the RRC layer of the UE ETSI TS 125 331 states in section 8 as quoted:

"The UE shall be able to process several simultaneous RRC procedures. After the reception of a message which invoked a procedure, the UE shall be prepared to receive and act on another message which may invoke a second procedure."

Furthermore there are specific instructions with regard to handling RRC procedures simultaneously where more than one procedure requires a change to the security configuration. This is described in UMTS RRC protocol specification ETSI TS 125 331 v3.10.0 (2002-03), in sections: 8.6.3.4; 8.6.3.5; 8.1.12.4a; 8.2.2.12a; 8.3.1.9a; 8.3.3.5a; 8.3.4.5a and others.

These sections basically state that if any procedure is initiated which requires a change to the security configuration while there is already a procedure on going which also requires a change to the security configuration, then it should be rejected.

In short, it may only be possible to have one procedure that changes the security configuration on-going at a time.

It may not be possible to genuinely handle RRC procedures simultaneously without the use of multiple processors and so single processor implementations must be at least partially sequential. This makes it difficult to implement the above functionality such that the UE behaviour is consistent with handling messages simultaneously.

SUMMARY

The details of an apparatus and method of handling simultaneous universal terrestrial radio access network radio resource control procedures which change the security configuration in a universal mobile telecommunications system user equipment disclosed herein may enable UE (User Equipment) to handle simultaneous UTRAN procedures generally, and to handle simultaneous UTRAN procedures which change the security configuration in particular.

In order to comply with the requirements of the 3GPP RRC specification the UE provided in accordance with the apparatus and method of the present application advantageously appears to the UTRAN as if the UE is processing procedures which change the security configuration simultaneously even though the UE is mostly handling procedures sequentially.

It is an object of the present application that an apparatus and method of handling simultaneous universal terrestrial radio access network radio resource control procedures which change the security configuration in a universal mobile telecommunications system user equipment is provided at a UE having a simultaneous message handling core stack for the core network, such as the NAS (Non-Access Stratum), and one or more access network stacks of the access networks, such as the AS (Access-Stratum), thereby ensuring that the UE appears to the UTRAN as if the UE is processing procedures which change the security configuration simultaneously while the UE is enabled to handle procedures sequentially.

According to one aspect of the present application, there is provided a user equipment apparatus having a security configuration, the apparatus adapted to receive messages from a UTRAN, select messages having a command, select commands requesting a security change procedure, the apparatus comprising: a message handler to receive a received message from the UTRAN, the received message having a received command, said message handler capable of extracting the received command from the received message thereby providing a security change procedure for select messages; a sequential processor to receive an ongoing command having an ongoing procedure, said sequential processor capable of invoking the ongoing procedure, said sequential processor capable of suspending ongoing processing upon reception of the received message at said message handler, said sequential processor capable of resuming processing of the ongoing procedure upon control of said message handler; a command store connected to the message handler to save the received command, said command store capable of storing the received command thereby providing a saved procedure reference; and a security configuration change detector to receive a potential security change command consisting of one of the received command, the saved command, and the ongoing procedure, said security configuration change detector capable of determining if the potential security change command contains a change to the security configuration; wherein said message handler is coupled to said command store, is coupled to said sequential processor, and is coupled to said security configuration change detector to save, process, and detect configuration changes in commands respectively, and to determine if there is an existing command at the user equipment, the existing command being one of the saved command and the ongoing command, such that the user equipment appears to the UTRAN as though it were processing the select commands simultaneously while said sequential processor is actually processing the existing command sequentially.

According to another aspect of the present application, there is provided a method of processing simultaneous commands at a user equipment having a security configuration, the simultaneous commands sent from a UTRAN to the user equipment, the method comprising the steps of: (a) determining if there is an existing command at the user equipment; (b) if there is an existing command at the user equipment, upon reception of a received command: (i) suspending the existing command processing; (ii) determining if both the received command and the existing command contain a security configuration change; (iii) if so determined, rejecting the received command; (iv) if not so determined, saving the received command to be processed once the existing command processing completes; and (v) resuming the existing command processing to allow the existing command processing to complete; such that the user equipment appears to the UTRAN to be processing commands simultaneously.

Other aspects and features of the present application will become apparent to those ordinarily skilled in the art upon review of the following description of specific embodiments of an apparatus and method of handling simultaneous universal terrestrial radio access network radio resource control procedures which change the security configuration in a universal mobile telecommunications system user equipment in conjunction with the accompanying figures.

BRIEF DESCRIPTION OF THE DRAWINGS

Embodiments of the present application will now be described, by way of example only, with reference to the attached figures, wherein.

Same reference numerals are used in different figures to denote similar elements.

DETAILED DESCRIPTION OF THE DRAWINGS

Figure 1:
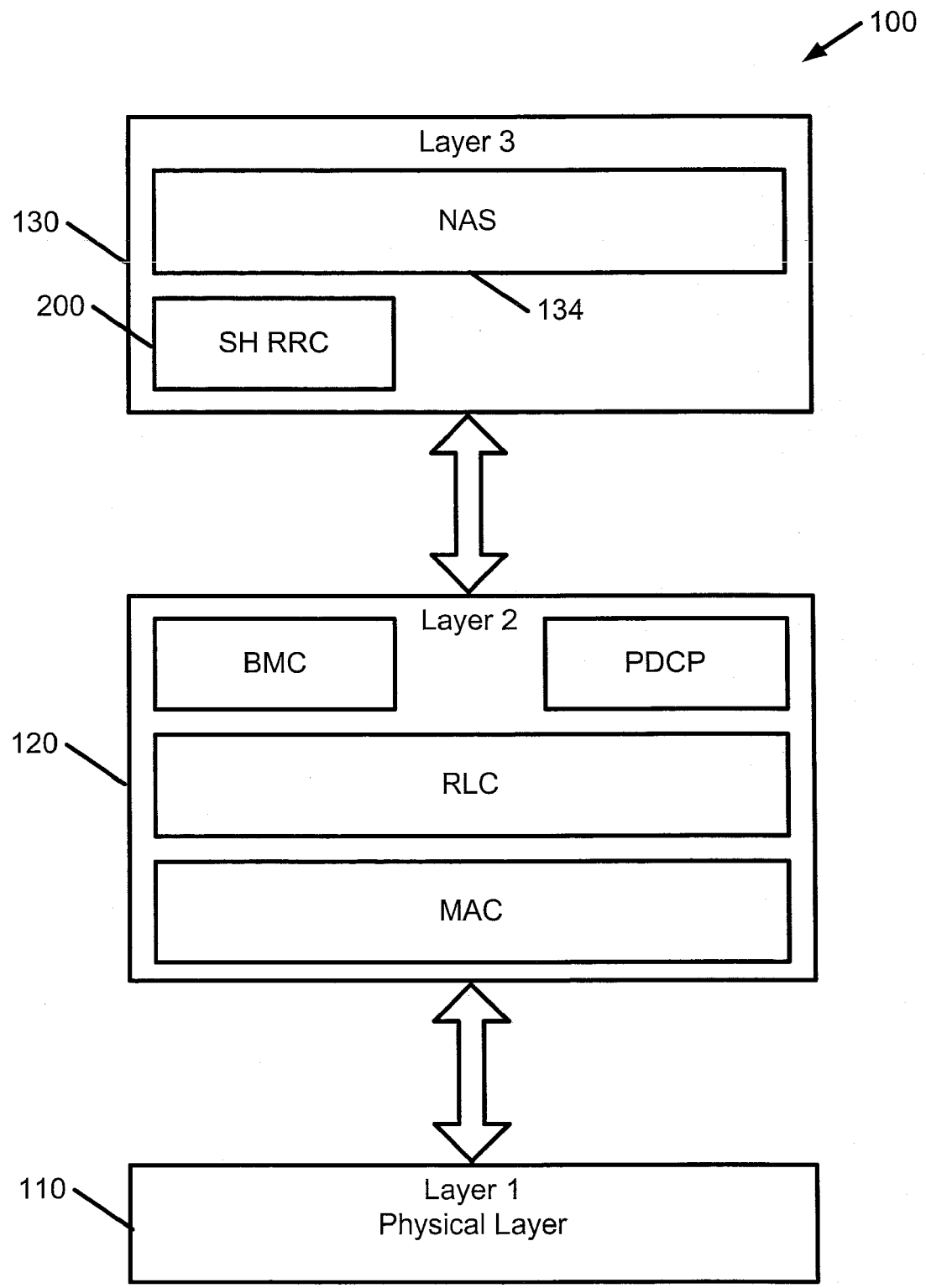
FIG. 1 is a block diagram illustrating an embodiment of a protocol stack apparatus provided with a simultaneous handling RRC block, in accordance with the present application.

Referring to the drawings, FIG. 1 is a block diagram illustrating an embodiment of a protocol stack apparatus provided with a simultaneous handling RRC block, in accordance with the present application.

The SH RRC block (Simultaneous Handling RRC) 200 is a sub layer of radio interface Layer 3 130 of a UMTS protocol stack 100. The SH RRC 200 exists in the control plane only and provides information transfer service to the non-access stratum NAS 134. The SH RRC 200 is responsible for controlling the configuration of radio interface Layer 1 110 and Layer 2 120. When the UTRAN wishes to change the UE configuration it will issue a message to the UE containing a command to invoke a specific RRC procedure. The SH RRC 200 layer of the UE decodes this message and initiates the appropriate RRC procedure. Generally when the procedure has been completed (either successfully or not) then the SH RRC sends a response message to the UTRAN (via the lower layers) informing the UTRAN of the outcome. Although it should be noted that there are a few scenarios where the SH RRC will not issue a response message to the UTRAN, in those cases the SH RRC need not and does not reply.

Advantageously, The SH RRC block 200 allows the protocol stack 100 to be seen as processing the UTRAN command procedures simultaneously while enabling the protocol stack 100 to process UTRAN command procedures sequentially.

Figure 2:
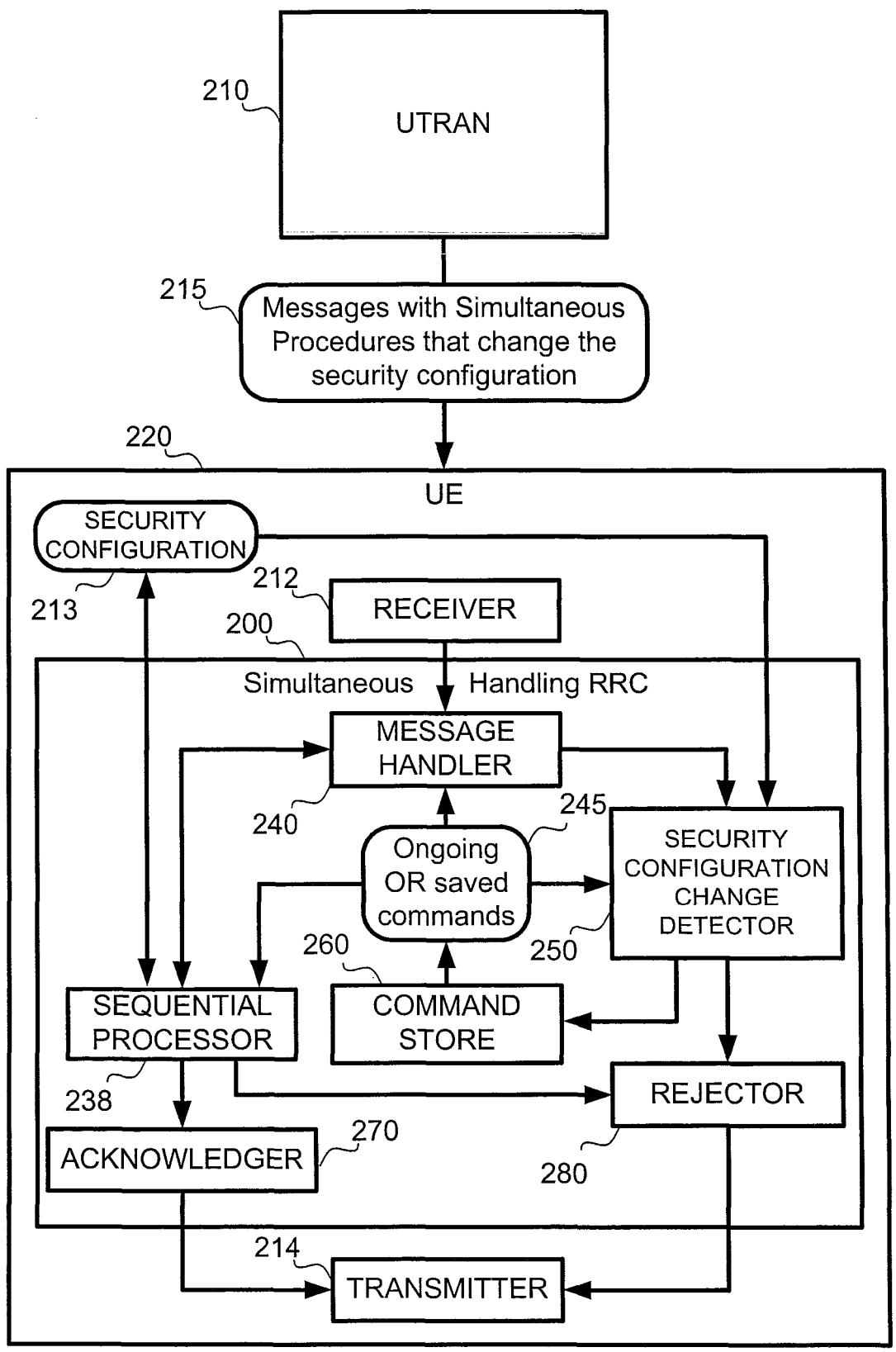
FIG. 2 is a block diagram illustrating in greater detail the simultaneous handling RRC block of FIG. 1.

Turning now to FIG. 2, FIG. 2 is a block diagram illustrating in greater detail the simultaneous handling RRC block of FIG. 1. UTRAN 210 sends messages with simultaneous procedures that change the security configuration 215 to the UE 220. UE 220 is provided with a receiver 212, and a transmitter 214 in order to receive the messages 215, and to respond to the UTRAN for those messages where a response is applicable. UE 220 is also provided with a simultaneous handling RRC block 200, which is connected to receive messages from UTRAN 210 via receiver 212, and which is connected to send responses to UTRAN 210 via transmitter 214. The connections between receiver 212 and simultaneous handling RRC 200, and between simultaneous handling RRC and transmitter 214 may involve blocks that are not expressly shown in FIG. 2, such as for example the protocol stack blocks of FIG. 1. UE 220 includes a security configuration 213, which is subject to change under the effect of the messages with simultaneous procedures that change the security configuration 213. Although not expressly shown in FIG. 2, security configuration can be considered a property of the access stratum (AS), so that changes to the security configuration involve messaging between the SH RRC and the rest of the AS.

The simultaneous handling RRC block 200, is provided with a message handler 240, a sequential processor 238, a security configuration change detector 250, a command store 260, an acknowledger 270 and a rejector 280.

Depending on the current state of simultaneous message handling RRC block 200, there may or may not be ongoing or saved commands 245, also referred to hereinafter as existing commands, in the SH RRC 200. As used in this description and in the appended claims, the term command is defined to mean either a procedure that was invoked from a message, or a message that includes an invocation to a procedure. For example, there would be no existing commands at the SH RRC if the sequential processor had no ongoing procedures and the command store had no saved messages. Conversely, it can be said that there are existing commands at the SH RRC if the sequential processor is processing an ongoing procedure, and/or if the command store had a saved message. It is envisaged that sequential processor 238 processes commands, i.e. either messages or procedures. Similarly, it is envisaged that command store 260 saves procedures, i.e. either procedures or messages.

The message handler 240 is connected to the receiver 212. Message handler 240 is capable of determining if there are any ongoing or saved commands 245, i.e. existing commands that exist in simultaneous handling RRC 200. If there are no existing commands, then sequential processor 238 processes received UTRAN commands in sequence. However, if message handler 240 determines that there is an existing command, for instance because sequential processor 238 is busy processing a previously received command that changes the security configuration 213, or because there is a saved command in the command store 260 that changes the security configuration, then message handler 240 routes the received command to the security configuration change detector block 250, which proceeds to determine if the received command changes the security configuration. If both the received command and the existing command change the security configuration 213, then the rejector 280 simply rejects the received command straightaway. On the other hand, if the received command does not change the security configuration 213, then the command store block 260 saves the received command so that it can be processed after the existing command has completed processing. Sequential processor 238 processes received and saved commands in sequence, and depending on the outcome of the processing, either rejects a specific message via rejector 280, or acknowledges a specific message via acknowledger 270. Both acknowledger 270 and rejector 280 communicate the outcome of simultaneous message handling RRC processing to the UTRAN via transmitter 214. In the event that a command does not require a response, sequential processor 238 need not send either a response or a rejection.

In the event that more than one existing command exists at the SH RRC 200, it is envisaged that the security configuration change detector 250 determine if any one of the existing commands changes the security configuration 213.

Advantageously, the apparatus of FIG. 2 enables the UE to process UTRAN procedures sequentially while the UTRAN sees the UE processing the UTRAN procedures simultaneously.

Figure 3:
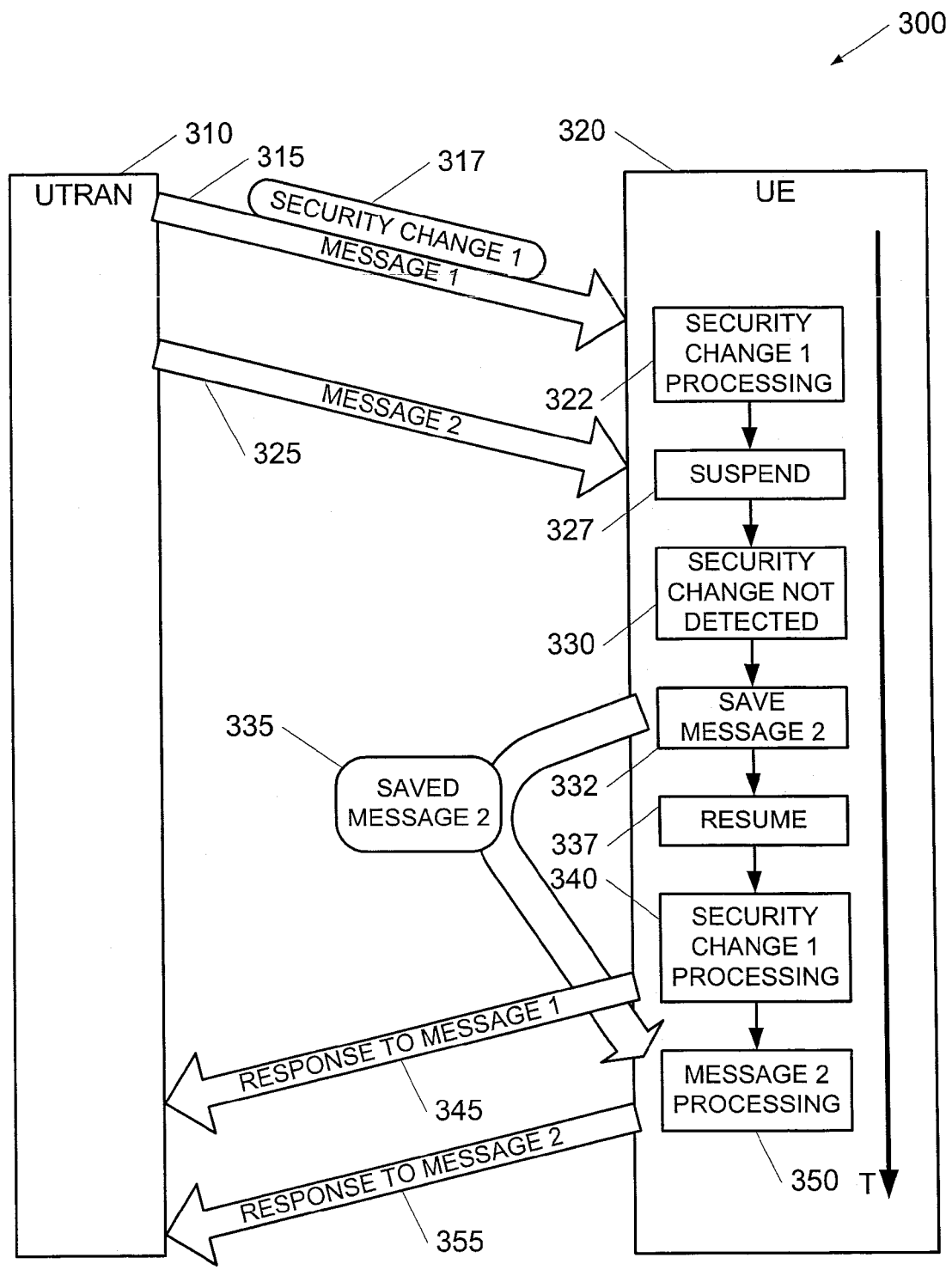
FIG. 3 is a first interaction diagram illustrating simultaneous procedure handling, in accordance with the present application.

Turning now to FIG. 3, FIG. 3 is a first interaction diagram illustrating simultaneous procedure handling, in accordance with the present application. UTRAN 310 sends a first message, 'message 1' 315 having 'security change 1' 317 to UE 320. Upon reception of 'message 1' 315, UE 320 begins security change 1 processing 322. While security change 1 processing 322 is ongoing, UTRAN 310 sends a second message, 'message 2' 325 to UE 320. Upon reception of 'message 2', UE 320 suspends 327 security change 1 processing 322 so as to determine if message 2 contains a security change. As illustrated, 'message 2' does not contain changes to the security configuration, so UE 320 determines that a security change is not detected 330. UE 320 therefore saves 'message 2' 325 at step 330 to provide 'saved message 2' 335, and resumes 337 security change 1 processing 340. Upon termination of security change 1 processing 340, UE 320 sends 'response to message 1' 345 back to UTRAN 310. However, since UE 320 advantageously has 'saved message 2' 335, the UE 320 proceeds to process 'saved message 2' as if it was just received from UTRAN 310. The result is that 'message 2 processing' 350 completes, and UE 320 sends 'response to message 2' 355 back to the UTRAN 310 so that from the point of view of the UTRAN 310 the UE is handling simultaneous procedures. Note that either response may be an acknowledgement or a rejection if, for example, the messages cannot be processed for other reasons other than those which concern security changes. Although not expressly shown in FIG. 3, if either message did not require a response, the UE would not send one.

Figure 4:
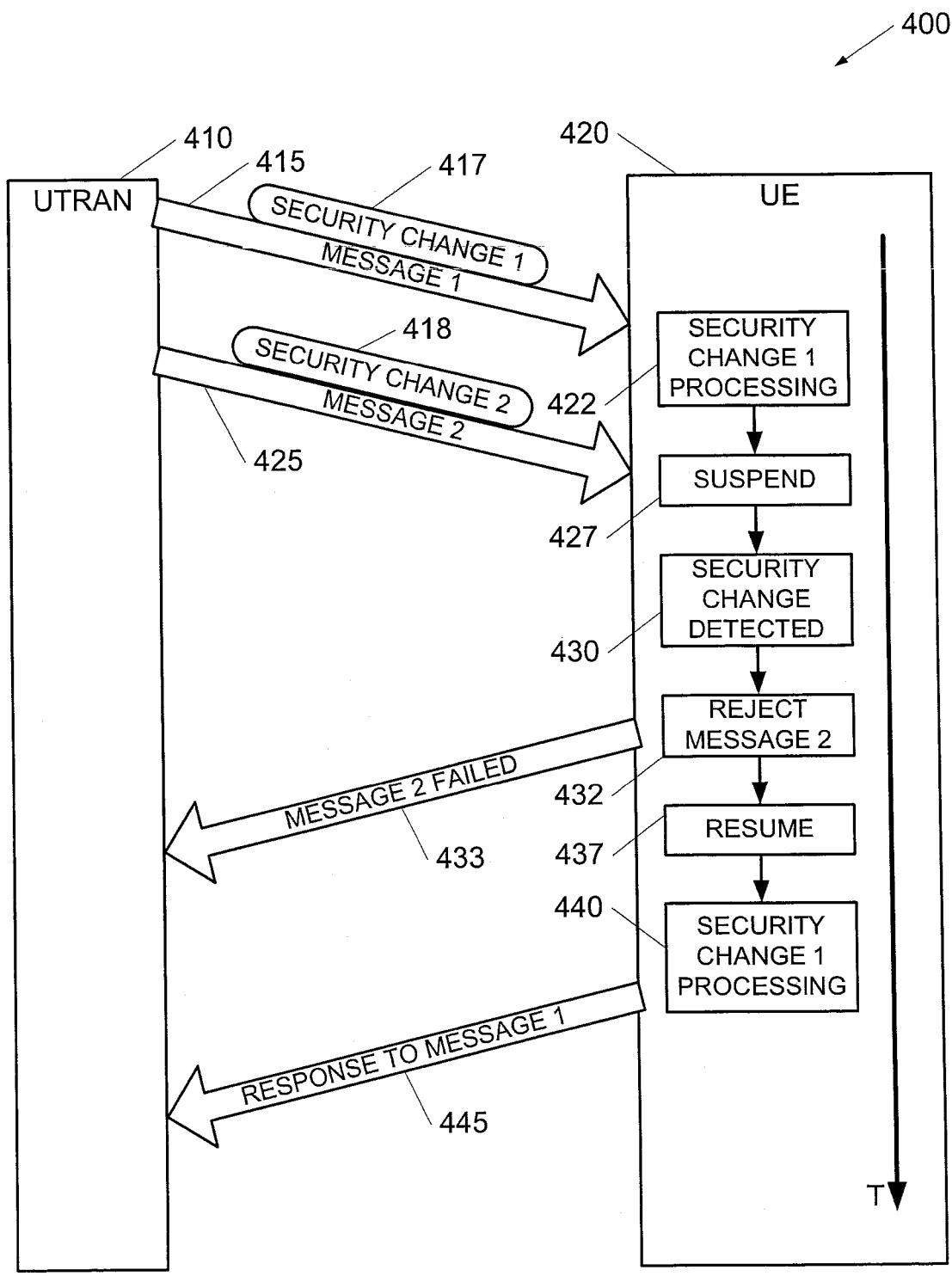
FIG. 4 is a second interaction diagram illustrating simultaneous procedure handling, in accordance with the present application.

Turning now to FIG. 4, FIG. 4 is a second interaction diagram illustrating simultaneous procedure handling, in accordance with the present application. UTRAN 410 sends a first message, 'message 1' 415 having 'security change 1' 417 to UE 420. Upon reception of 'message 1' 415, UE 320 begins security change 1 processing 422. While security change 1 processing 422 is ongoing, UTRAN 410 sends a second message, 'message 2' 425 having 'security change 2' 418 to UE 420. Upon reception of 'message 2', UE 420 suspends 427 security change 1 processing 422 so as to determine if message 2 contains a security change. As illustrated, 'message 2' does contain changes to the security configuration, so UE 420 determines that a security change is detected 430. UE 420 therefore rejects 'message 2' 425 at step 432 and sends a 'message 2 failed' 433 message back to UTRAN 410. UE 420 resumes 437 security change 1 processing 440. Upon termination of security change 1 processing 440, UE 420 sends 'response to message 1' 445 back to UTRAN 410. However, since UE 420 advantageously has rejected 'message 2' 425, so that from the point of view of the UTRAN 410 the UE is handling simultaneous procedures. Note that response 445 may be an acknowledgement or a rejection if, for example, the message cannot be processed for other reasons other than those which concern security changes. Although not expressly shown in FIG. 3, if either message did not require a response, the UE would not send one.

Although the term message was used in FIGS. 3 and 4, and their descriptions, it is envisaged that either procedures or commands be simultaneously handled in substantially the same manner as illustrated and described.

Figure 5:
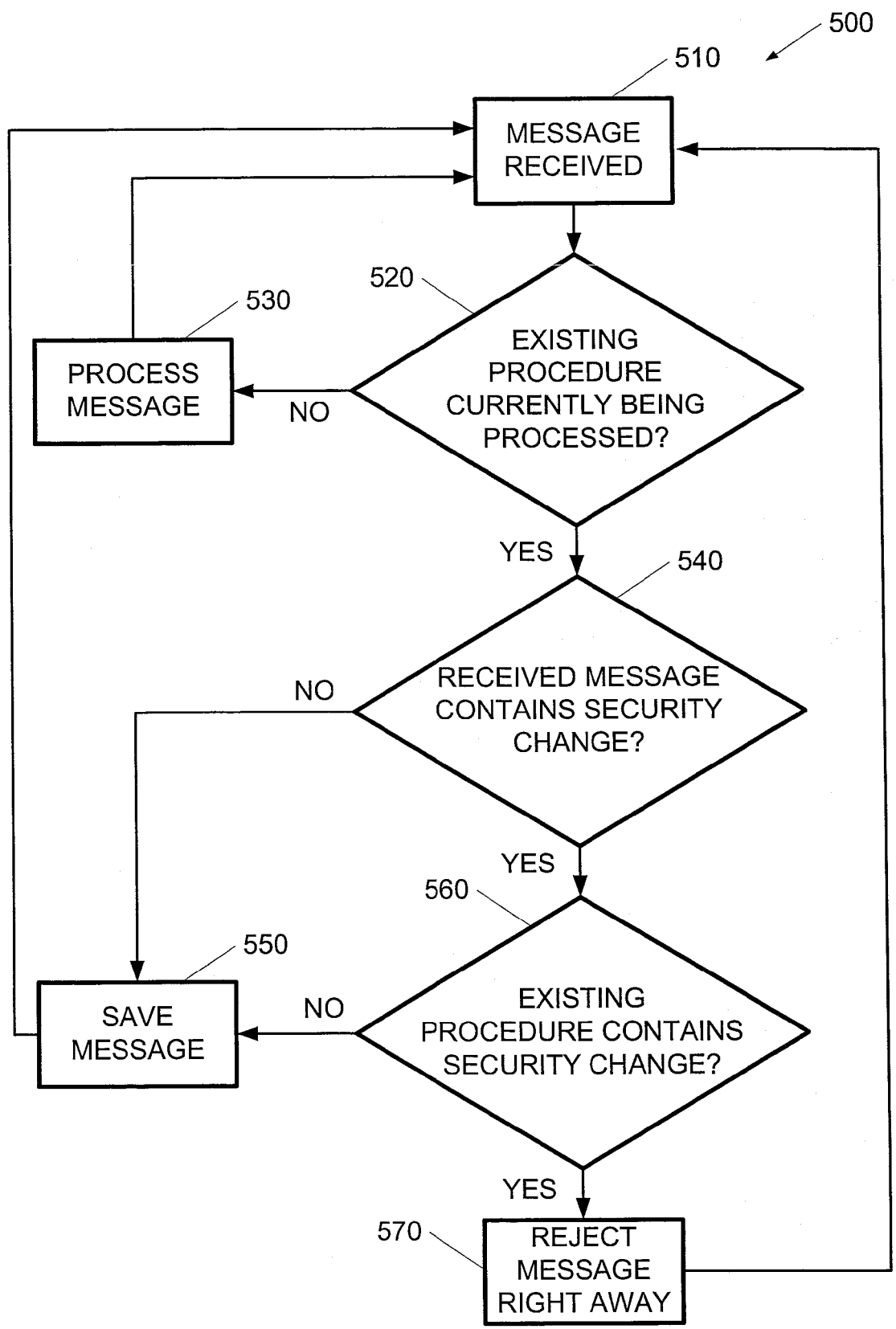
FIG. 5 is a flowchart illustrating an embodiment of a method of simultaneous procedure handling in accordance with the present application.

Turning now to FIG. 5, FIG. 5 is a flowchart illustrating an embodiment of a method of simultaneous procedure handling in accordance with the present application.

The UE can only process one or part of one procedure at a time, therefore, subsequent messages that are received while the UE is busy are 'saved'.

When each UTRAN message is received, a check is made to see if a security change is requested. If there is no security change then the message is either saved or processed immediately depending on the current load on the UE.

If the message does contain a security change, but no currently active or saved procedure contains a security change, then the new message is also either saved or processed immediately depending on the current load on the UE.

If the message does contain a security change and a currently active or saved procedure also contains a security change, then the newly received message is rejected straight away. This is done even if the saved message, with which it conflicts, is not yet being processed due to other messages being processed before it.

The flowchart of FIG. 5 summarizes an embodiment of a method provided at the UE in accordance with the present application. At step 510, the method 500 begins. At step 510, a message is received from the UTRAN at the UE. At step 520, a determination is made as to whether there is an existing procedure that is currently being processed, and if no existing procedure is currently being processed then step 530 ensues. At step 530 whereat the received message is processed, and the method goes back to step 510 whereat to wait for new messages. However, if there is an existing procedure currently being processed, then the method continues at step 540 whereat the method examines the contents of the message received at step 510 to determine whether the received message contains a security change. If the received message contain security change, then the method continues at step 560 whereat it is determined if any existing procedure contains a security change. If it is so determined, then the method continues at step 570 whereat the received message is rejected and the method returns to step 510 in order to wait for new messages. However, if the existing procedure does not contain security changes, then the method continues at step 550 whereat the received message is saved until the existing procedure completes, after which the saved message re-enters step 510 as if it were just received.

Figure 6:
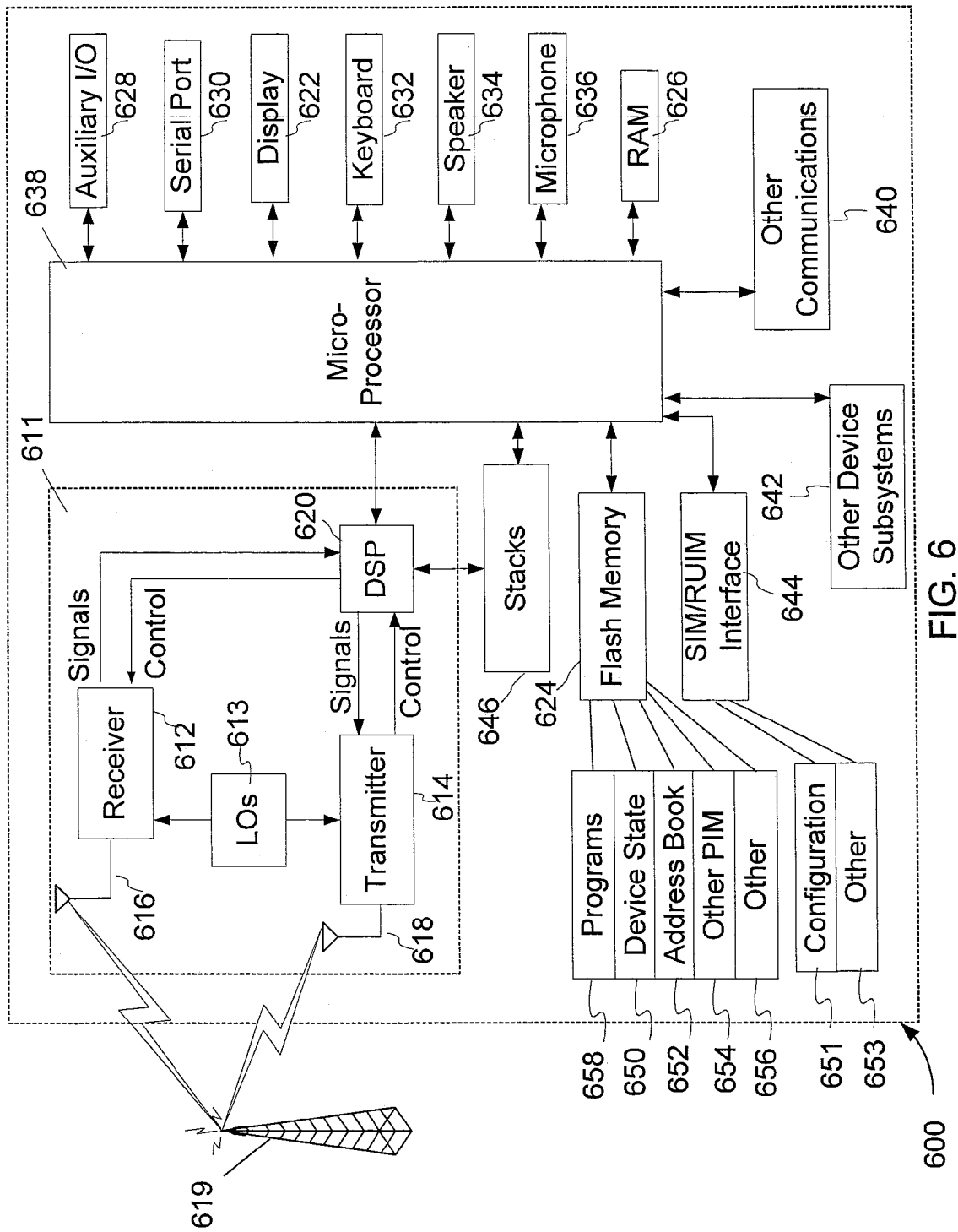
FIG. 6 is a block diagram illustrating a mobile device, which can act as a UE and co-operate with the apparatus and methods of FIGS. 1 to 5.

Turning now to FIG. 6, FIG. 6 is a block diagram illustrating a mobile device, which can act as a UE and co-operate with the apparatus and methods of FIGS. 1 to 5, and which is an exemplary wireless communication device. Mobile station 600 is preferably a two-way wireless communication device having at least voice and data communication capabilities. Mobile station 600 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 600 is enabled for two-way communication, it will incorporate a communication subsystem 611, including both a receiver 612 and a transmitter 614, as well as associated components such as one or more, preferably embedded or internal, antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate. For example, mobile station 600 may include a communication subsystem 611 designed to operate within the Mobitex™ mobile communication system, the DataTAC™ mobile communication system, GPRS network, UMTS network, EDGE network.

Network access requirements will also vary depending upon the type of network 619. For example, in the Mobitex and DataTAC networks, mobile station 600 is registered on the network using a unique identification number associated with each mobile station. In UMTS and GPRS networks, however, network access is associated with a subscriber or user of mobile station 600. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 600 will be unable to carry out any other functions involving communications over the network 600. The SIM interface 644 is normally similar to a card-slot into which a SIM card can be inserted and ejected like a diskette or PCMCIA card. The SIM card can have approximately 64K of memory and hold many key configuration 651, and other information 653 such as identification, and subscriber related information.

When required network registration or activation procedures have been completed, mobile station 600 may send and receive communication signals over the network 619. Signals received by antenna 616 through communication network 619 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile station 600 preferably includes a microprocessor 638 which controls the overall operation of the device. Communication functions, including at least data and voice communications, are performed through communication subsystem 611. Microprocessor 638 also interacts with further device subsystems such as the display 622, flash memory 624, random access memory (RAM) 626, auxiliary input/output (I/O) subsystems 628, serial port 630, keyboard 632, speaker 634, microphone 636, a short-range communications subsystem 640 and any other device subsystems generally designated as 642.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the microprocessor 638 is preferably stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. Microprocessor 638, in addition to its operating system functions, preferably enables execution of software applications on the mobile station. A predetermined set of applications that control basic operations, including at least data and voice communication applications for example, will normally be installed on mobile station 600 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 619. In a preferred embodiment, the PIM data items are seamlessly integrated, synchronized and updated, via the wireless network 619, with the mobile station user's corresponding data items stored or associated with a host computer system. Further applications may also be loaded onto the mobile station 600 through the network 619, an auxiliary I/O subsystem 628, serial port 630, short-range communications subsystem 640 or any other suitable subsystem 642, and installed by a user in the RAM 626 or preferably a non-volatile store (not shown) for execution by the microprocessor 638. Such flexibility in application installation increases the functionality of the device and may provide enhanced on-device functions, communication-related functions, or both. For example, secure communication applications may enable electronic commerce functions and other such financial transactions to be performed using the mobile station 600.

In a data communication mode, a received signal such as a text message or web page download will be processed by the communication subsystem 611 and input to the microprocessor 638, which preferably further processes the received signal for output to the display 622, or alternatively to an auxiliary I/O device 628. A user of mobile station 600 may also compose data items such as email messages for example, using the keyboard 632, which is preferably a complete alphanumeric keyboard or telephone-type keypad, in conjunction with the display 622 and possibly an auxiliary I/O device 628. Such composed items may then be transmitted over a communication network through the communication subsystem 611.

For voice communications, overall operation of mobile station 600 is similar, except that received signals would preferably be output to a speaker 634 and signals for transmission would be generated by a microphone 636. Alternative voice or audio I/O subsystems, such as a voice message recording subsystem, may also be implemented on mobile station 600. Although voice or audio signal output is preferably accomplished primarily through the speaker 634, display 622 may also be used to provide an indication of the identity of a calling party, the duration of a voice call, or other voice call related information for example.

Serial port 630 in FIG. 6, would normally be implemented in a personal digital assistant (PDA)-type mobile station for which synchronization with a user's desktop computer (not shown) may be desirable, but is an optional device component. Such a port 630 would enable a user to set preferences through an external device or software application and would extend the capabilities of mobile station 600 by providing for information or software downloads to mobile station 600 other than through a wireless communication network. The alternate download path may for example be used to load an encryption key onto the device through a direct and thus reliable and trusted connection to thereby enable secure device communication.

Other communications subsystems 640, such as a short-range communications subsystem, is a further optional component which may provide for communication between mobile station 600 and different systems or devices, which need not necessarily be similar devices. For example, the subsystem 640 may include an infrared device and associated circuits and components or a Bluetooth™ communication module to provide for communication with similarly enabled systems and devices.

When mobile device 600 is used as a UE, protocol stacks 646 include an apparatus and method of handling simultaneous universal terrestrial radio access network radio resource control procedures which change the security configuration in a universal mobile telecommunications system user equipment.

Although the terms message, procedure, and command have been specifically used in the above description and the accompanying figures, it is envisaged that either messages, commands, or procedures be handled simultaneously in accordance with the apparatus and methods of the present application, so that these terms can be interchanged without changing the scope or departing from the spirit of the present application.

The above-described, embodiments of the present application are intended to be examples only. Those of skill in the art may effect alterations, modifications and variations to the particular embodiments without departing from the scope of the application.

We claim:

1. A user equipment device configured to have a security configuration, the device further configured to receive messages originating from a UTRAN and to send messages receivable by a UTRAN, the device comprising:

a message handler configured to determine if a received message has a received command therein, and to extract the received command if there is one;

a command store operably connected to the message handler to save the received commands in received order, said command store also capable of storing the received command and it's associated procedure references providing thereby a stored command and its associated procedure;

a sequential processor operably connected to the command store, configured to process a current command and the command's associated procedure, the processor further configured, upon completion of the current command, to receive a next command from the command store in their stored order and to then process the next command and its associated procedure, and further configured to allow the message handler to cause the current command to be suspended and then later restarted as if no interruption had occurred, and upon restarting the current command the command store will have the same commands in the same order as when the current command was suspended;

a security configuration change detector in operable communication with the message handler, configured to receive a received command and determine if the received command would change the security configuration and if any of the current and stored commands would change the security configuration, and further to (i) determine if the received command and at least one of the current and saved commands would change the security configuration, and if true to cause, in conjunction with the message handler, a rejection message of this command to be sent from the device and to cause the received command to not be processed by the processor, (ii) determine if the received command would change the security configuration, and that none of the current and saved commands would change the security configuration, and if true to cause, in conjunction with the message handler, the received command to be processed by the processor in accordance with any other current or saved commands, and, (iii) determine if the received command does not change the security configuration, and if true to cause, in conjunction with the message handler, the received command to be processed by the processor in accordance with any other current or saved commands;

whereby sent messages, in response to received messages that include messages that contain commands that change the security configuration, give the appearance of being processed in parallel but where the device comprises a sequential processor.

2. The device in claim 1, further comprising a microprocessor to handle user equipment processing.

3. The device in claim 2, wherein said sequential processor is provided by a procedure that is executed by said microprocessor.

4. The apparatus as recited in claim 2, wherein said message handler is provided by an interrupt service routine that is executed by said microprocessor.

5. A method for a user equipment device, the device comprising a sequential processor, a command store configured to store commands in sequence waiting to be processed by the processor, and a security configuration, the device configured to receive messages originating from a UTRAN and to send messages receivable by a UTRAN, to give the appearance of processing security configuration changing commands in parallel using a method comprising:

receiving a message;

determining, by a message handler, if a received message has a received command therein, and to extract the received command if there is one;

providing, to a security configuration change detector by the message handler, the received command;

determining, by the security configuration change detector, if the received command and at least one of a current command being processed by the sequential processor and a saved command would change the security configuration, and if true to cause, in conjunction with the message handler, a rejection message of this command to be sent from the device and to cause the received command to not be processed by the processor;

determining, by the security configuration change detector, if the received command would change the security configuration and that none of the current and saved commands would change the security configuration, and if true to cause, in conjunction with the message handler, the received command to be processed by the processor in accordance with any other current and saved commands;

determining, by the security configuration change detector, if the received command does not change the security configuration, and if true to cause, in conjunction with the message handler, the received command to be processed by the processor in accordance with any other current or saved commands;

whereby sent messages, in response to received messages including messages that contain commands that change the security configuration, give the appearance of being processed in parallel but where the device comprises a sequential processor.

6. The method of claim 5, further comprising a microprocessor to handle user equipment processing.

7. The method of claim 6, wherein said sequential processor is provided by a procedure that is executed by said microprocessor.

8. The method of claim 6, wherein said message handler is provided by an interrupt service routine that is executed by said microprocessor.

* * * * *